Oct. 30, 1962 C. G. EZZO 3,061,760
ELECTRICAL APPARATUS
Filed Dec. 10, 1959
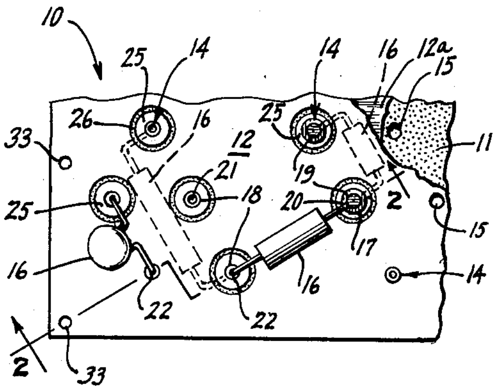
FIG. 1.
FIG. 2.
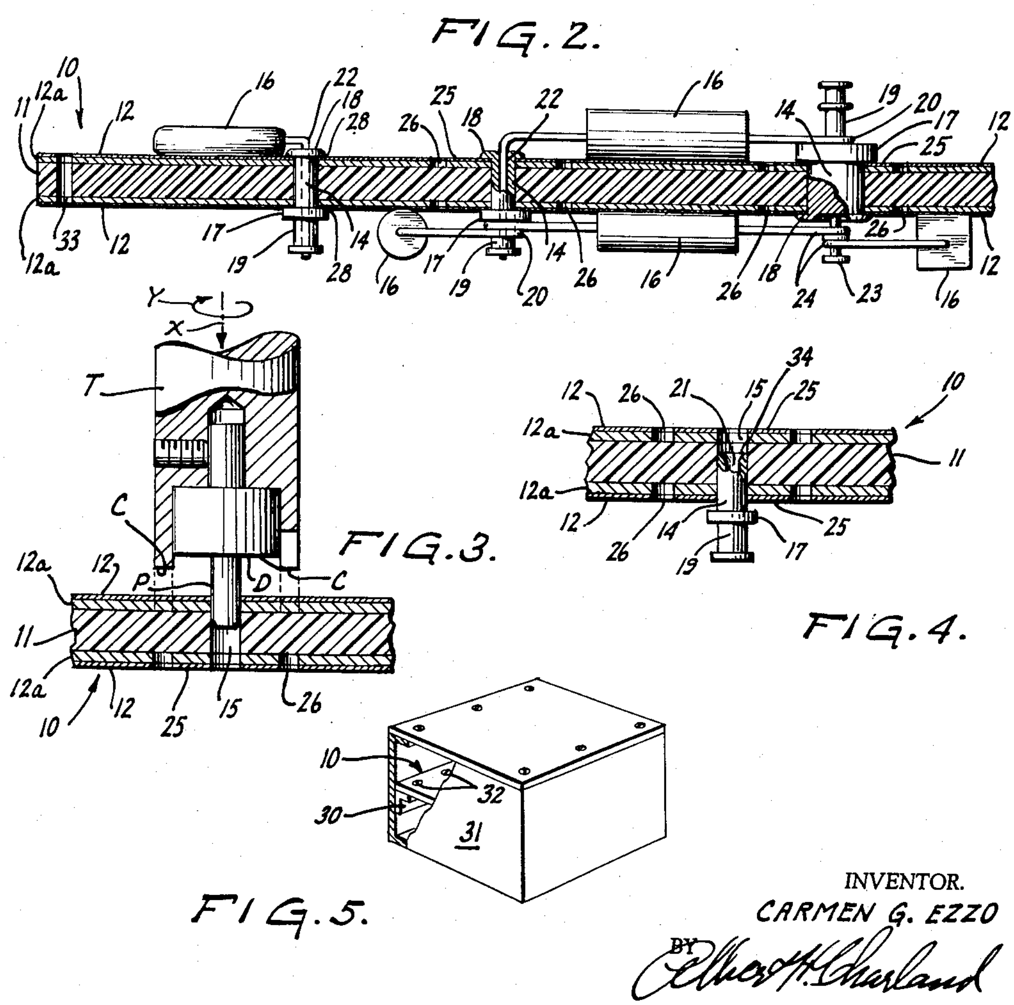
FIG. 2. FIG. 3. FIG. 4. FIG. 5.
INVENTOR.
CARMEN G. EZZO
BY Elliott H. Charland
ATTORNEY United States Patent Office 3,061,760
Patented Oct. 30, 1962

3,061,760
ELECTRICAL APPARATUS

Carmen G. Ezzo, Philadelphia, Pa., assignor, by mesne assignments, to Philco Corporation, Philadelphia, Pa., a corporation of Delaware Filed Dec. 10, 1959, Ser. No. 858,744
4 Claims. (Cl. 317—100)

The present invention relates to electrical apparatus, and more particularly to electric circuit assemblies.

Certain types of electronic equipment require that electrical components be disposed closely adjacent to each other and arranged to occupy minimum space within a casing which encloses the equipment. In an endeavor to satisfy these requirements, it has been the general practice to assemble electrical components on a supporting panel. In this manner, the electrical association of individual components is simplified and the mounting of associated components within a restricted space is facilitated by the fact that the components and panel constitute a unitary circuit structure which can be readily manipulated. However, with a circuit structure of this kind it is frequently found that the lack of adequate dissipation of heat generated by the components during normal circuit operation, the lack of effective shielding of circuit components, and the lack of rigidity in the mounting of components, are constant sources of difficulties and problems.

Accordingly, it is a primary object of this invention to provide an electric circuit assembly which is constructed in a manner to promote dissipation of heat from the components while overcoming the other difficulties and problems mentioned above.

It is another and more specific object of the invention to improve the construction of a unitary circuit assembly so as to enhance its mechanical rigidity, to insure proper electrical coupling of its componets and protect them against destructive heat and deleterious electrostatic conditions.

The invention is particularly characterized in that it provides a simplified and inexpensively produced circuit assembly in which electrical components incorporated in circuitry on opposite sides of a mounting panel are not affected by severe mechanical vibrations, and in which the mounting panel is inherently capable of establishing ground connections between selected circuit components and parts of the circuit assembly enclosure, as well as of conducting heat away from the circuit components and electrostatically shielding the circuitry disposed on opposite sides of the panel.

A preferred embodiment which achieves the above-indicated, as well as other objects and characteristic features of the invention, employs a supporting panel composed of a non-conductive base clad with conductive shields. The panel is constructed to provide for rugged electrical connection between electrical components in desired circuitry on both sides of the panel, the latter being also constructed to provide for intimate heat exchange relation between the circuit components and the conductive shields, while electrically isolating certain components from said shields and electrically grounding other components through said shields.

The details of the preferred embodiment mentioned above will now be described in connection with the accompanying drawing, in which:

FIGURE 1 is a top plan view of a portion of an electric circuit assembly constructed in accordance with the principles of this invention;

FIGURE 2 is an enlarged cross sectional view taken substantially on line 2—2 of FIGURE 1;

FIGURES 3 and 4 are fragmentary cross-sectional views illustrating successive steps in producing the assembly shown in FIGURES 1 and 2; and FIGURE 5 is a sectional-elevational view illustrating the assembly mounted within its enclosure.

Having more particular reference to the drawing, the circuit assembly portion illustrated in FIGURES 1 and 2 includes a laminated panel 10 which consists of a non-conductive board 11 and superposed conductive layers 12 and 12*a* covering the opposite sides of said board. In practice, the board is made of electrically insulating plastic sheet material of predetermined dielectric strength and mechanical stability, such as glass epoxy, and the superposed layers 12 and 12*a* are formed of metals which have high thermal and electrical conductive properties. In this latter respect, it has been found that a satisfactory panel is obtained when copper is electrolytically deposited on the opposite sides of the board 11 to constitute the inner layers 12*a* and when silver is flashed over the deposited copper to constitute the outer layers 12.

As shown, component-connecting members in the form of turret-type conductive lugs 14 are disposed according to a predetermined pattern over the area of the panel 10. For that purpose the panel is provided with perforations 15 through which the lugs 14 pass so as to be accessible from either side of said panel for mounting electrical components 16. Of course, it will be understood that the components mounted on the opposite sides of the panel and electrically connected by means of the lugs 14 would be of the various kinds required for the desired circuitry and would include such items as resistors, capacitors, inductance coils, and the like. Also, it will be understood that the turret-type lugs 14 can vary in form and would be selected to effect connection of components in accordance with the desired circuitry.

In the illustrated embodiment, each lug 14 has a lateral shoulder 17 and a laterally swedged flange 18; the shoulder abutting the conductive layer material on one side of the panel 10, and the flange snugly bearing upon the conductive layer material on the other side of said panel. Thus, said shoulders and flanges cooperate for rigidly clamping the lugs 14 in position on the panel 10. As best seen in FIGURE 2, the portion of each lug where the shoulder 17 is located, terminates with an axially extended pin 19 which provides a tie-point for conductive attachment of component leads as represented at 20 (FIGURES 1 and 2). Certain lugs are of tubular shape to provide an axial bore 21 (FIGURE 4) for the reception and conductive connection of component leads as represented at 22 (FIGURES 1 and 2), whereas other lugs are of solid construction and provided with a second axially extended pin for conductive attachment of component leads as represented at 24 (FIGURE 2).

In particular accordance with the invention, minor portions 25 of the conductive layer material surrounding certain of the perforations 15, are separated from the remaining and major portion of said material so that those lugs which occupy said certain perforations, are electrically and thermally isolated from each other as well as from said major portion of the layer material. For that purpose, the illustrated panel 10 is provided with annular interstices 26 which break up the continuity of the superposed conductive layers 12 and 12*a* by exposing restricted surface areas of the insulating board 11. In this manner, the separated minor portions 25 form circular metallic islands which serve as solid bases for mounting the associated lugs, and which serve also as protective means for preventing damage to the board 11 by heat applied to said lugs when soldering component leads thereto.

The lugs located within the continuous major portion of the layer material are, as represented at 28, in conductive engagement with said material. Thus, said major portion of the layer material and the lugs in conductive engagement therewith, provide for electrical ground connections of the circuitry on the opposite sides of the panel 10, when the latter is mounted on a conductive metal support structure or chassis 30 which, in the embodiment illustrated in FIGURE 5, is a rigid part of a sealed metal casing 31. In this illustrated embodiment, the casing 31 houses the assembled circuit panel 10 which is maintained in firm conductive engagement with the support structure 30 by means of suitable fastening elements, such as screws 32, passing through mounting apertures 33 (FIGURES 1 and 2) in said panel.

As clearly appears in FIGURE 2, the insulated body of each of the circuit components 16 rests firmly on the continuous major portion of the outer conductive layers 12. Thus said components lie in intimate heat exchange relation with respect to the conductive layer material so that when the panel 10 is mounted within the casing 31 as represented in FIGURE 5, said conductive layer material while serving to shield the circuitry on opposite sides of said panel and to establish ground connections for said circuitry, also serve as means for carrying heat away from the circuit components 16. In this respect, it will be understood that the heat picked up and carried by the conductive material of layers 12 and 12*a*, is transmitted to the walls of the metal casing 31 which walls, in turn, reject the heat to the ambient atmosphere.

In constructing the above described circuit panel assembly, it is desirable first to form the perforations 15 and then to form the interstices 26 according to the predetermined circuit pattern. The perforations can be and preferably are formed by drilling holes of required size to accommodate the various lugs 14, and the interstices can be and preferably are formed by cutting and removing narrow bands or strips of conductive material from layers 12 and 12*a*.

As represented in FIGURE 3, a manually operated or machine driven tool T can be and preferably is employed to cut and remove the conductive layer material so as to define and isolate the circular minor portions 25. As shown, the tool is provided with a pilot portion P, cutting portions C, and a depth-gauge portion D. The portion P is of proper size to fit into the perforations 15 so as to center and guide the tool in its cutting operation; the portions C are configured and arranged to cut and remove an annular band of the conductive layer material when, as indicated by arrows X and Y, the tool is brought into engagement with the panel 10 and rotated with respect thereto; and the portion D is located in position to come in contact with said panel so as to prevent the tool from cutting into the insulating board 11.

As represented in FIGURE 4, the lugs 14 are inserted into the perforations 15, each lug being secured to the panel by swedging the inwardly tapered end portion 34 of the lug to form the locking flange 18 described above and shown in FIGURE 2. Thereafter, the circuit components 16 are connected to the fixed lugs, in the desired circuitry, on the opposite sides of the panel 10 which may then be mounted in the casing 31 as previously stated.

From the foregoing description, it will be appreciated that circuit components incorporated in a circuit panel assembly constructed in accordance with the principles of the invention are effectively protected against severe mechanical vibrations and sudden shocks. Also, it will be appreciated that the simplicity and usefulness of such a circuit assembly are enhanced by the fact that the supporting panel serves multiple functions, namely, the function of electrically conductive means to provide electrical ground connections for circuitry on the opposite sides of the panel, the function of thermally conductive means to carry heat away from the circuit components on said opposite sides of the panel, and the function of electrostatically shielding means to bar electrostatic influence of the circuitry on one side of the panel from the circuitry on the opposite side of said panel.

It is to be understood that while a preferred embodiment has been shown and described, the invention embraces such changes and variations as come within the scope of the subjoined claims.

I claim:

1. Electrical apparatus comprising a laminated panel composed of a non-conductive board clad with conductive material, said panel having perforations traversing said board and material, annular interstices concentric with certain of said perforations to define minor portions of said material at said certain perforations and to separate and isolate said minor portions from the remaining and major portion of said material, component-connecting members extending through said perforations and anchored in engagement with said conductive material on said panel, and circuit components secured in electrically conductive engagement with said members and disposed in intimate thermal exchange relation with said major portion of said conductive material.

2. Electrical apparatus comprising a laminated panel composed of a non-conductive board the opposite sides of which are covered with layers of conductive material, said panel having perforations traversing said board and layers, each of said layers having interstices surrounding certain of said perforations to define minor portions of the conductive material about said certain perforations and to separate and isolate said minor portions from the remaining and major portion of said conductive material, component-connecting members extending through said perforations and anchored in engagement with said conductive material on said panel, and circuit components secured in electrically conductive engagement with said members and disposed in intimate thermal exchange relation with said major portion of said conductive material.

3. Electrical apparatus comprising in combination with a casing having conductive metal walls, a laminated panel composed of a non-conductive board clad with conductive material, said panel having perforations traversing said board and conductive material, annular interstices concentric with certain of said perforations to define minor portions of said conductive material at said certain of said perforations and to separate and isolate said minor portions from the remaining and major portion of said material, component-connecting members extending through said perforations and anchored in engagement with said conductive material on said panel, circuit components secured in electrically conductive engagement with said members and disposed in intimate thermal exchange relation with said major portion of said conductive material, and support means for mounting said panel within said casing and for conductively connecting said major portion of conductive material to said walls of said casing.

4. Electrical apparatus comprising in combination with a housing having conductive metal walls, a laminated panel composed of non-conductive board the opposite sides of which are covered with layers of conductive material, said panel having perforations traversing said board and layers, each of said layers having interstices surrounding certain of said perforations to define minor portions of the conductive material of each layer at said certain perforation and to separate and isolate said minor portion from the remaining and major portion of said conductive material of each layer, component-connecting member extending through said perforations and anchored in engagement with said layers on said panel, circuit components secured in electrically conductive engagement with said members and disposed in intimate thermal exchange relation with said major portion of said conductive material of each layer, and means for mounting said panel within said casing and for conductively connecting said layers of said panel to said walls of said casing.

References Cited in the file of this patent

UNITED STATES PATENTS

| | | |
|---|---|---|
| 2,586,854 | Myers | Feb. 26, 1952 |
| 2,596,166 | Peterson | May 13, 1952 |
| 2,611,010 | Sass | Sept. 16, 1952 |
| 2,744,214 | Di Marco | May 1, 1956 |
| 2,872,391 | Hauser | Feb. 3, 1959 |